(12) United States Patent
Kamperschroer

(10) Patent No.: US 6,947,731 B1
(45) Date of Patent: Sep. 20, 2005

(54) METHOD FOR CONVERTING STATUS MESSAGES OUTPUT IN SPOKEN FORM

(75) Inventor: Erich Kamperschroer, Hamminkeln (DE)

(73) Assignee: Siemens Aktiengesellschaft, Munich (DE)

( * ) Notice: Subject to any disclaimer, the term of this patent is extended or adjusted under 35 U.S.C. 154(b) by 381 days.

(21) Appl. No.: 10/088,769

(22) PCT Filed: Sep. 21, 2000

(86) PCT No.: PCT/DE00/03297

§ 371 (c)(1),
(2), (4) Date: Mar. 20, 2002

(87) PCT Pub. No.: WO01/24450

PCT Pub. Date: Apr. 5, 2001

(30) Foreign Application Priority Data

Sep. 30, 1999 (DE) .................. 199 47 100

(51) Int. Cl.$^7$ .................. H04M 3/00

(52) U.S. Cl. .................. 455/419; 455/41.2; 455/418; 455/420; 455/414.1; 455/414.4; 340/426.13; 340/426.24; 704/258; 704/275; 704/269; 704/270.1; 704/277; 370/241; 370/245; 370/908

(58) Field of Search .................. 455/41.1, 41.2, 455/41.3, 418, 419, 420, 414.1, 414.4; 340/426.13, 340/426.24; 704/258, 275, 269, 270.1, 277; 370/241, 245, 908

(56) References Cited

U.S. PATENT DOCUMENTS

| 4,343,990 | A | * | 8/1982 | Ueda | 219/492 |
| 4,426,733 | A | * | 1/1984 | Brenig | 455/79 |
| 6,169,789 | B1 | * | 1/2001 | Rao et al. | 379/110.01 |
| 6,184,787 | B1 | * | 2/2001 | Morris | 340/521 |
| 6,317,668 | B1 | * | 11/2001 | Thibault | 701/35 |
| 6,629,077 | B1 | * | 9/2003 | Arling et al. | 704/275 |

FOREIGN PATENT DOCUMENTS

| GB | 2 295 067 | 5/1996 |
| WO | WO 97/25808 | 7/1997 |

OTHER PUBLICATIONS

Protokolle am Beispiel des OSI Referenzmodells, pp. 102-111.
XP-002162174—Reference Manual for the HCS 11-Release 3.62 Mar. 10, 1998.

* cited by examiner

Primary Examiner—Vivian Chin
Assistant Examiner—Minh D Dao
(74) Attorney, Agent, or Firm—Bell Boyd & Lloyd LLC

(57) ABSTRACT

A method for conversion of a voice output of appliance statuses, wherein three spoken phrases are stored for each appliance to be controlled, with the first spoken phrase being allocated to a first appliance status, the second spoken phrase being allocated to a second appliance status, and the third spoken phrase being allocated for at least one third status. When an appliance status is checked, the relevant appliance sends a data word. If the value (which identifies the current appliance status) of the data word corresponds to a first value, the first spoken phrase is output, if it corresponds to a second, the second spoken phrase is output, and the third spoken phrase and the third value are output for at least one third value.

1 Claim, 1 Drawing Sheet

METHOD FOR CONVERTING STATUS MESSAGES OUTPUT IN SPOKEN FORM

BACKGROUND OF THE INVENTION

An arrangement for translating protocol data units for incompatible networks to one another is an interface which, in some circumstances, has considerable intelligence and is referred to in the specialist world by the term "gateway". This interface carries out functions for layers 3 or above (up to layer 7) in accordance with OSI reference model (see Course Leaflets, Year 48, 2/1995, pages 102 to 111 and N. Klußmann: Lexikon der Kommunikations—und Informations-technik [Dictionary of Communications and Information Technology], 1997, Hüthig-Verlag, pages 360 to 362.

The term network refers to all resources which connect service access points that are at a distance from one another and provide these services for communication purposes. This relates not only to networks with a very limited extent, such as local area networks, but also to networks with a very large extent; for example, telecommunications networks.

Networks whose protocol data units are incompatible include, in particular, telecommunications networks (for example, the public telephone network (PSTN), the integrated service digital network (ISDN), the landline network that is based on the asynchronous digital subscriber line (ADSL), the mobile radio network based on the GSM Standard (first and second mobile radio generation), the mobile radio network based on the UMTS Standard (third mobile radio generation), the mobile network based on the DECT and/or PHS Standard, the global computer network (Internet), the electricity supply network and the broadband cable network) and any type of local area networks (for example, the home automation system, including a network with a radio transmission path, a PLC transmission path, an IRDA transmission path, an InstaBus transmission path, an HES Bus transmission path, a twisted pair transmission path or a coaxial cable transmission path).

According to the documents ?Funkschau [radio show] 3/1989, pages 45 and 46; Elektronik [electronics] 18/1995, pages 50 to 58; Elektronik [electronics] 17/1996, pages 42 to 47 and pages 48 to 53; Elektronik [electronics] 4/1997, pages 64 to 72; Elektronik [electronics] 1/1998, pages 30 to 33; Elektronik [electronics] 17/1998, pages 74 to 77, pages 78 to 81 and pages 82 to 84? the home automation system describes the technical management of buildings and dwellings. This covers everything that relates to the convenience of the occupant. This includes, for example, load and energy management, water heating, lighting, ventilation and heating systems, control of motor-driven elements (for example, blinds, garage doors, roller shutters, etc.) and safety and protection devices (for example, smoke/fire alarms, intruder warning systems, access monitoring systems, motion indicators, etc.)

Furthermore, the term "technical management" also covers the control of any other electrical appliances, from adjusting a clock to switching on a coffee machine. For installation of home automation systems (building bus systems), the following preconditions must be essentially satisfied for successful market introduction:

1. No need for any additional wiring
2. Little cost involved
3. Uniform communication standard
4. Interoperability
5. Plug-and-Play capability In the recent past, various standards for home bus systems have crystallized out in the field of home automation systems based on different approaches (consumer-item orientated approach, installation-item oriented approach, computer-hardware-oriented approach). However, to a greater or lesser extent, these represent specific solutions for home automation. These standards include:

1. For the consumer-item-oriented approach, the Consumer Electronics Bus (CEBus), the ESPRIT Home System (EHS) and the Home Bus System (HBS);
2. for the installation-item-oriented approach, the Bati Bus, the European Installation Bus (EIB) and the Smart House; and
3. for the computer-hardware-oriented approach, the Local Operating Network (LON) and The Real Time Operating System Nucleus (TRON).

The question as to which of the standards that have been mentioned ultimately will be adopted, and will thus become the de-facto standard, depends essentially on the attractiveness of the respective standard for home automation. However, such a system is attractive and really useful only if there are a wide range of products which communicate via this network. Only if the house or dwelling occupier knows when he/she purchases a washing machine, an electric cooker, etc., that the respective appliance will communicate with his/her home bus system, will he/she perhaps be prepared to pay the additional costs for a home automation system, and to install such a system in his/her house. However, if the manufacturer of these appliances does not know which bus system will win the race in the end, then this manufacturer will not, in fact, be prepared to invest in an expensive interface for the respective bus system in order to find, subsequently, that the appliances cannot, in fact, be sold any better as a result of this investment.

In order to improve the attractiveness of the home automation systems described above, an intelligent home interface (residential gateway) is, therefore, required which is both cost-effective and offers the manufacturer of appliances which can be remotely controlled for home automation purposes wide variation options for the implementation of the interfaces for the bus system that is used for home automation.

One approach for providing an "intelligent home interface" (residential gateway) as it is known from a German patent application entitled "Anordnung zum Ineinanderübersetzen von Protokolldateneinheiten inkompatibler Netze" [Arrangement for translation of protocol data units of incompatible networks to one another, official application file reference 19904544.5, is to provide for translation of protocol data units of incompatible networks to one another, a telecommunications network (for example, a public telephone network (PSTN), the integrated service digital network (ISDN), the landline network based on the asynchronous digital subscriber line (ADSL), the mobile radio network based on the GSM Standard (first and second mobile radio generation), the mobile radio network based on the UMTS Standard (third mobile radio generation), the mobile network based on the DECT and/or PHS Standard, the global computer network (Internet), the electrical power supply network and the broadband cable network) and a local area network (for example, in the form of a home automation system, including a network with a radio transmission path, a PLC transmission path, an IRDA transmission path, an InstaBus transmission path, an HES Bus transmission path, a twisted pair transmission path or a coaxial cable transmission path) via a telecommunications terminal which is connected to the telecommunications network, has a remote control structure and is allocated to any given x interface for connection to the local network via a specific network adapter.

Owing to the increasing convergence of communications and information appliances, the telecommunications terminal in this case has the "intelligent interface" function ("gateway" function) added to it. The information (for example, control commands, status information, alarm messages, etc.) that needs to be transmitted for remote control of appliances in the local area network is transmitted from the interface in a specific record format, with a first record format part which indicates the appliance identification and/or the appliance address, a second record format part which contains the control command for the appliance, and a third record format part which contains the control payload information.

A telecommunications terminal designed in this way makes it possible to drive any appliances connected to that telecommunications terminal.

To do this, an operator has to use a remote control unit; for example, just by transmitting the appliance identification and the control command, to initiate an action in the appliance defined by the appliance identification, to switch the appliance to a different operating mode, or to check the current operating mode.

It is known for the output of the operating mode to be transmitted as a data word to the remote control unit, where it is generally produced in the form of an alphanumeric output on a display on the remote control unit.

Furthermore, appliances are known which convert data words, which generally contain numerical values, via a device for speech synthesis into the spoken corresponding form, which is produced as the output. For example, the value "0" is output as a spoken "zero".

The user of such appliances then, generally, has to use a list or a manual to determine the meaning of this value; that is, in particular, an appliance status associated with this value.

This type of appliance status output is very tedious for an operator and requires that this list or manual always be available in order to control the appliance remotely.

"XPRESS Reference Manual for the HCS II—Release 3.62" Oct. 3, 1998, CREATIVE CONTROL CONCEPTS XP002162174 discloses a "home automation system" appliance, which is equipped as a single-board computer which can be upgraded in modular form. The appliance allows the domestic appliances to be controlled which are connected to the single-board computer via network modules, with voice outputs via a telephone line being possible via a speech module and a telephone interface module, when DTMF tones are entered.

An object to which the present invention is directed is to specify a method for conversion of a voice output of status messages, particularly in home automation systems, which can be implemented cost-effectively and easily and can be used universally for respectively different network types (for example, the types of networks mentioned above).

SUMMARY OF THE INVENTION

In the method according to the present invention, a unique appliance identification is allocated to each appliance which is connected to a telecommunications terminal and is, thus, included in a local area network, via which the telecommunications terminal can address the respective appliance, in particular for remote control, and via which each appliance is identified. Three spoken phrases are allocated to each appliance identification and, thus, to each appliance, and are stored in this association. Statuses which an appliance, contained in the local area network, may assume are taken by the telecommunications terminal from the value of a data word which is transmitted to the telecommunications terminal from that appliance. If the value of this data word corresponds to a first value, then the first spoken phrase associated with the appliance is selected as the output phrase. If the value of the data word corresponds to a second value, then the second spoken phrase allocated to that appliance is selected as the output phrase. If the value of the data word corresponds neither to the first nor the second value, then the value of the data word corresponds at least to a third value, and the third spoken phrase allocated to that appliance is selected, in conjunction with the third value, as the output phrase. If the output phrase is selected, it is converted to a form that is legible for a device for speech synthesis, and is transmitted to this device for speech synthesis in order to be output.

The method according to the present invention achieves greater user acceptance of a system provided in this way for remote control of appliances, in particular home automation systems, since the use of spoken phrases for outputting appliance statuses makes it easier for the user to understand the data word values, which are rather cryptic without any additional information. Furthermore, this also substantially avoids any need to refer to the appliance statuses that are associated with the values of the data word so that the remote control, in particular the remote checking of the appliance status, can be initiated by the user without any major effort. Furthermore, restricting the spoken phrases associated with an appliance, in particular to three spoken phrases, together with the simplicity of the method, results in the required memory space being minimal. The association of spoken phrases with appliance statuses also can be used universally for any given appliance.

Additional features and advantages of the present invention are described in, and will be apparent from, the following Detailed Description of the Invention and the Figures.

DETAILED DESCRIPTION OF THE INVENTION

Figure 1:
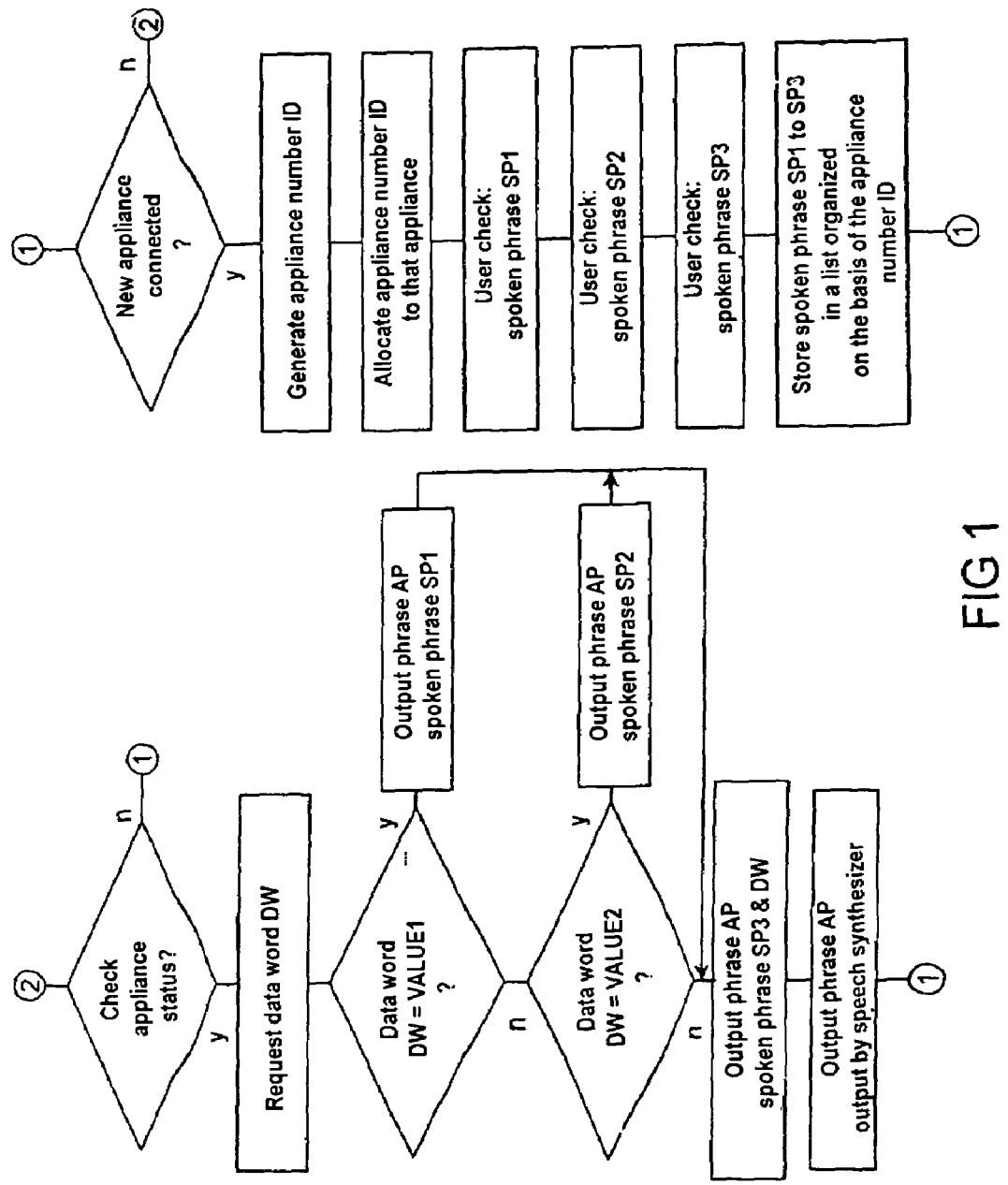
FIG. 1 shows a flowchart of a method for converting a voice output of appliance statuses according to the teachings of the present invention.

At the start 1 of the method, which is carried out in a telecommunications terminal (preferably in the background) so that the normal procedures in telecommunications terminals continue to be carried out without any disturbance, a check is first of all carried out to determine whether a new appliance has been connected to the telecommunications terminal.

If a new appliance has been connected, an appliance number ID is generated for that appliance, and is allocated uniquely to that appliance for appliance identification.

The appliance number ID is generated such that a sequential number is allocated to the appliances. As such, the respective most-recently-allocated appliance number ID is incremented and allocated to the respective newly connected appliance.

As an alternative to this, it is possible to allocate to the appliance as the appliance identification an appliance number ID which is predetermined by that appliance and, after being connected to the telecommunications terminal, is transmitted to this telecommunications terminal during an initialization process.

A combination of alphabetic and numerical characters is also feasible for generating an appliance identification ID.

Once the appliance number ID has been allocated, the user is requested via a device which is associated with the telecommunications terminal, particularly a microphone, to enter a first spoken phrase SP1, which is allocated to an appliance status identified by a first value VALUE1, to specify a second spoken phrase SP2, which is allocated to a second appliance status identified by a second value VALUE2, and to specify a third spoken phrase SP3, which is allocated to any other appliance status, which is identified by a value VALUE3 which differs from the first and second values VALUE1, VALUE2.

If, for example, a remotely controllable roller shutter is connected to the telecommunications terminal, whose values that are identifying the statuses are defined in an interval [0; 255], with the value "0" corresponding to the "roller shutter entirely raised" status, the value "255" corresponding to the "roller shutter entirely lowered" status, and with the other values identifying a status between these two statuses, then the user can speak the formulation "roller shutter entirely raised" as the first spoken phrase SP1 and can allocate this to the value "0", and then can speak the formulation "roller shutter entirely lowered" as the second spoken phrase SP2 and can allocate this to the value "255". All other values which lie in the interval [1; 254] can be spoken by the user and associated with the formulation "the current position of the roller shutter corresponds to the value:".

Following the user check, the three spoken phrases SP1 to SP3 are stored in conjunction with the appliance number ID in the form of an organized list such that one, and only one, associated spoken phrase SP1, SP2, or SP3 can be determined via a current appliance number ID and a current value VALUE1, VALUE2 or VALUE3 identifying an appliance of state.

Alternatively, it is possible to provide for the spoken phrases SP1, SP2 and SP3 to be provided for each appliance such that they are already in digitized form, processed appropriately for storage and for speech synthesis, on a memory medium, such as a floppy disc or a memory chip in the appliance, so that they need not be entered by the user.

After the storage process, the method is started once again with a check as to whether a new appliance has been connected at the startpoint 1.

If the check indicates that no new appliance has been connected, then a check is carried out in a second step 2 to determine whether an appliance status of some particular appliance, which is located in the local area network and is connected to the telecommunications terminal, is being queried by a user.

If this is the case, the appliance is requested to transmit a data word DW, which contains the value VALUE1, VALUE2 or VALUE3 of the current status of the appliance. Once the data word DW has been received, a check is carried out to determine which of the values VALUE1, VALUE2 or VALUE3 is contained in the data word DW. If the data word DW contains the first value VALUE1, then the first spoken phrase SP1, which is associated with the appliance being checked, is set as the output phrase AP on the basis of the current appliance number ID and the current value VALUE1, VALUE2 or VALUE3 of the data word DW.

If the data word DW contains the second value VALUE2, then the second spoken phrase SP2, which is associated with the appliance being checked, is set as the output phrase AP on the basis of the current appliance number ID and the current value VALUE1, VALUE2 or VALUE3 of the data word DW.

For at least one third value VALUE3, which is not the same as the first value VALUE1 or the second value VALUE2, the spoken phrase SP1 which is associated with the appliance being checked is set, followed by the third value VALUE3, as the output phrase AP on the basis of the current appliance number ID and the current value VALUE3 of the data word DW.

Once the spoken phrase has been defined, it is processed such that it can be transmitted and output by a device for speech synthesis.

If, for example, the user is checking the status of the roller shutters, then the formulation "roller shutter entirely raised" is output to the user if a transmitted data word DW contains the first value VALUE1 "0", the formulation "roller shutter entirely lowered" is output to the user for a transmitted data word DW whose second value is VALUE2 "255", and for every value ([1; 254]) which differs from this, such as a third value VALUE3 "23", the formulation "the current position of the roller shutter corresponds to the value: 23" is output to the user.

After each output, the method is finally continued from the startpoint 1.

If the check finds that the user is not checking any appliance status of any appliance which is located in the local area network and is connected to the telecommunications terminal, then the method is likewise continued at the startpoint 1.

Although the present invention has been described with reference to specific embodiments, those of skill in the art will recognize that changes may be made thereto without departing from the spirit and scope of the present invention without departing from the hereafter appended claims.

What is claimed is:

1. A method for conversion of a voice output of status messages from at least one appliance which is contained in a local area network and is connected to a telecommunications terminal, the method comprising the steps of:

allocating a unique appliance identification to the at least one appliance;

storing first, second and third spoken phrases, which can be predetermined, for the at least one appliance;

transmitting a status of the at least one appliance to the telecommunications terminal as a data word;

allocating the first, second and third spoken phrases as an output phrase to statuses of the at least one appliance, when the data word is transmitted, such that the first spoken phrase is selected as the output phrase for a first status which is identified by a first value of the data word, the second spoken phrase is selected as the output phrase for a second status which is identified by a second value of the data word, and both the third spoken phrase and a third value of the data word, which is being converted for voice output and differs from the first and second values, are selected as the output phrase for at least one third status, which is identified by the third value of the data word; and transmitting the output phrase for its outputting to a device for speech synthesis.

* * * * *